United States Patent [19]

Buzinkai et al.

[11] Patent Number: 5,116,919
[45] Date of Patent: May 26, 1992

[54] PROCESS FOR INCREASING THE RELATIVE VISCOSITY OF POLYAMIDES WITH REDUCED THERMAL DEGRADATION

[75] Inventors: John F. Buzinkai, Chattanooga, Tenn.; Marion R. DeWitt, Jr., Midlothian, Va.; Robert C. Wheland, Wilmington, Del.

[73] Assignee: E. I. du Pont de Nemours and Company, Wilmington, Del.

[21] Appl. No.: 623,263

[22] Filed: Dec. 5, 1990

[51] Int. Cl.$^5$ .............................. C08G 69/48
[52] U.S. Cl. ........................ 525/420; 524/86; 524/96; 524/99; 524/115; 524/130; 524/148; 525/419; 528/487; 528/492
[58] Field of Search ............ 528/487, 492; 524/86, 524/96, 99, 115, 130, 148; 525/419, 420

[56] References Cited

U.S. PATENT DOCUMENTS

| | | | |
|---|---|---|---|
| 3,872,055 | 3/1975 | Furukawa et al. | 260/45.7 P |
| 3,947,424 | 3/1976 | Tomek | 260/45.75 C |
| 4,543,407 | 9/1985 | Curatolo et al. | 528/336 |
| 4,912,175 | 3/1990 | Wheland et al. | 525/420 |
| 4,966,949 | 10/1990 | Wheland | 528/487 |

FOREIGN PATENT DOCUMENTS 1-104652 10/1987 Japan.
1-104653 10/1987 Japan.
1-104654 10/1987 Japan.

OTHER PUBLICATIONS

Roczniki Chemii Ann. So. Chim. Polonorum, 37, 1315 (1963)—E. Maruzewska-Wieczorkowska and J. Michalski.
J. Chem. Soc., 4154 (1957)—J.I.G. Cadogan.

*Primary Examiner*—Harold D. Anderson

[57] ABSTRACT

A process for increasing the relative viscosity of a polyamide includes heating the polyamide in the presence of a base and a catalyst with the catalyst being at least one compound of the formula:

$$X-(CH_2)_n PO_3 R_2$$

wherein X is 2-pyridyl, 4-morpholino, 1-pyrrolidino, 1-piperidino or $R'_2-N-$ wherein $R'$ is an alkyl group having between 1 and 12 carbon atoms;
n is an integer from 2 to 5; and
R, being the same or different, is H or an alkyl group having between 1 and 12 carbon atoms.

14 Claims, 1 Drawing Sheet

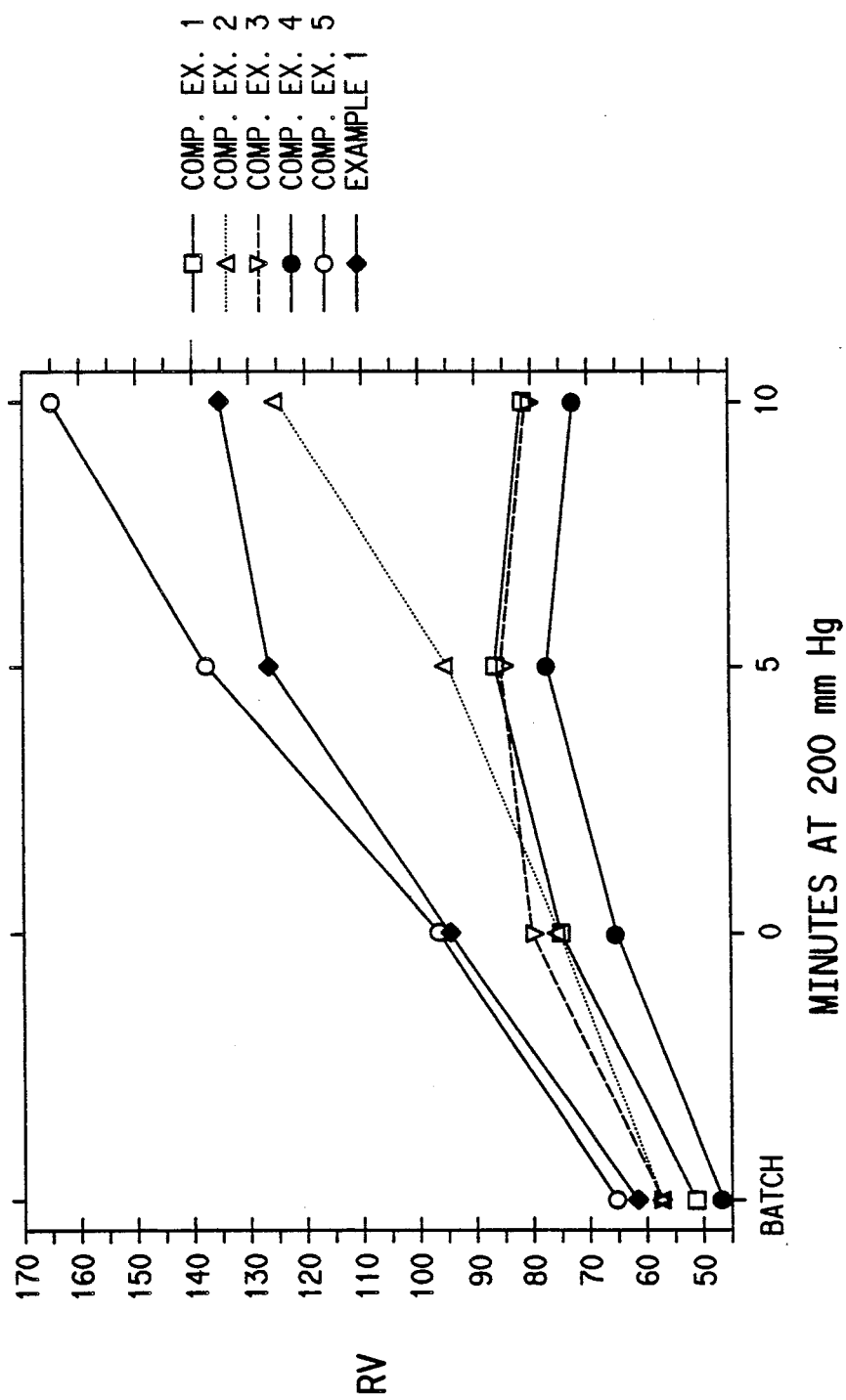

PROCESS FOR INCREASING THE RELATIVE VISCOSITY OF POLYAMIDES WITH REDUCED THERMAL DEGRADATION

BACKGROUND OF THE INVENTION

The present invention relates to processes useful in the manufacture of polyamides and more particularly relates to a process for increasing the relative viscosity of polyamides while reducing thermal degradation.

For the manufacture of high strength nylon fibers and other uses, high quality, linear polyamides with high relative viscosity (RV) are often desired. Known processes for increasing the RV of a polyamide typically employ a phosphorous acid catalyst in the polyamide together with elevated temperatures and less than the equilibrium level of $H_2O$ in contact with the polyamide to promote the amidation reaction between terminal carboxylic and amino groups of the polymer. At relatively low RV levels, the length of the polymer chains is increased in a predominantly linear fashion to achieve an increase in RV.

With some polyamides, particularly polyadipamides such as poly(hexamethylene adipamide), problems arise due to thermal degradation which results in branched polymer and increased "gel" formation when known processes are used for increasing the RV to higher levels. "Gel", a very high molecular weight, cross-linked polymer, forms in the polymer and can deposit on surfaces in contact with the molten polymer during polymerization or in subsequent handling such as in transfer lines and spinneret packs in melt spinning operations. Since the gel is essentially insoluble and often can only be removed from such equipment using extreme measures such as by burning, gel formation increases the cost of using such high RV polymer. Moreover, polymer containing particles of gel is of generally lower quality and is less suited for the production of high strength fiber.

When it is attempted to suppress thermal degradation and decrease gel formation by adding a base to the polymer, the catalytic effect of some otherwise very effective phosphorous acid catalysts, such as phenyl phosphinic acid, is decreased to a sufficient extent that high RV polymer cannot be made efficiently. In a continuous polymerization process, this results in a limitation of throughput, increased sensitivity to process changes and shorter equipment life due to the more extreme conditions which are required. In addition, due to the slower reaction, the polymer may not have reached equilibrium RV before a subsequent operation such as melt-spinning which can result in a variable product.

SUMMARY OF THE INVENTION

The invention relates to an improved process for increasing the relative viscosity of a polyamide while minimizing thermal degradation and gel formation. The process of the invention includes heating the polyamide in the presence of a base and a catalyst with the catalyst being at least one compound of Formula I below:

$$X-(CH_2)_nPO_3R_2 \qquad I$$

wherein

X is 2-pyridyl, 4-morpholino, 1-pyrrolidino, 1-piperidino or $R'_2-N-$ wherein R', being the same or different, is an alkyl group having between 1 and 12 carbon atoms;

n is an integer from 2 to 5;

R, being the same or different, is H or an alkyl group having between 1 and 12 carbon atoms. Preferably, the catalyst is present in said polyamide in an amount between about 1 and about 15 moles per $10^6$ g of polymer and the base is present in an amount between about 1 and about 40 equivalents per $10^6$ g of polymer. It is also advantageous for the ratio of equivalents of base to moles of total phosphorous acid compounds present to be at least about 0.5, preferably at least 1.0, and most preferably at least about 2.0.

In accordance with a preferred form of the present invention, X is 2-pyridyl or 1-pyrrolidino.

In accordance with a more preferred form of the present invention, X is 2-pyridyl and n is 2.

The invention provides an improved process for increasing the RV of polyamides. Linear, high RV polyamides with an RV level of 60 and above, or preferably 90 and above, can be made at efficient rates and the polymer so produced is less susceptible to gel formation. The process is particularly well suited for the production of high RV polyamides which are prone to gel formation such as poly(hexamethylene adipamide) by either melt or solid phase polymerization.

BRIEF DESCRIPTION OF THE DRAWINGS

FIG. 1 is a graphical representation of the RV increase with respect to time during polymerization of Example I and Comparative Examples 1–5.

DETAILED DESCRIPTION

The process of the invention is useful for increasing the RV of a wide variety of polyamides including, for example, poly(hexamethylene adipamide) (66 nylon) and poly(caproamide) (6 nylon), poly(tetramethylene adipamide) (46 nylon) and their copolymers. A preferred class of polyamides are aliphatic polyamides having amide units formed from 5, 6, or 7 carbon diacids, since many of these polyamides are particularly prone to thermal degradation and gel formation. The invention is thus advantageously employed with the widely used aliphatic polyadipamides such as poly(hexamethylene adipamide) (66 nylon) and poly(tetramethylene adipamide) (46 nylon) and their copolymers including copolymers in which the adipamide units are present only in a minor amount. Poly(hexamethylene adipamide) (66 nylon) is the most preferred polyamide for the practice of the present invention.

The catalysts used in the process of this invention are either known or they can be produced in accordance with conventional processes. The syntheses of catalysts useful for the practice of the process of the present invention can be performed in accordance with U.S. Pat. No. 4,912,175, which is hereby incorporated by reference. The catalyst 2-(2'-pyridyl)ethyl phosphonic acid can be synthesized by the base catalyzed addition of diethylphosphite to 2-vinylpyridine followed by the acid catalyzed hydrolysis of the resulting ester. 3-(2'-pyridyl)propylphosphonic acid is reported by E. Maruzewska-Wieczorkowska and J. Michalski in Roczniki Chemii Ann. Soc. Chim. Polonorum, 37, 1315 (1963). In the case of 3-(1-pyrrolindino)propylphosphonate, 1,3-dibromopropane can be reacted with triethylphosphite to make diethyl 3-bromopropylphosphonate, which in turn is reacted with excess pyrrolidine. A literature preparation of diethyl-2-diethylaminoethylphosphonate starting from diethylaminethylammonium chloride. diethylphosphite and sodium in ethanol is very similar in spirit: J. I. G. Cadogan, J. Chem. Soc., 4154 (1957).

Preferred catalysts for use in accordance with the present invention are catalysts of the Formula I above wherein X is 2-pyridyl or 1-pyrrolidino. Since the phosphonate esters hydrolyze in a melt of the polymer, there is generally little difference in effect between catalysts of Formula I with R being H or an alkyl group with between 1 and 12 carbon atoms in melt phase polymerization. An especially preferred catalyst is 2-(2'-pyridyl)ethyl phosphonic acid and its alkyl esters.

With respect to those catalysts of the invention wherein X is 2-pyridyl, it is contemplated that this group can be substituted by any moiety which does not deleteriously interfere with the advantages of the catalysts of this invention. Examples of such substituted 2-pyridyl radicals include but are not limited to those substituted in the 3, 4, and/or 5 positions with at least one $C_xH_{2x+1}$ group wherein x is an integer from 1 to about 10 inclusive.

The same non-deleterious type of substitution is also contemplated with respect to the alkylene group bridging the phosphorous atom with group X. Examples of substituted alkylene groups include but are not limited to those wherein one or more hydrogens of the alkylene group is substituted by $C_xH_{2x+1}$ wherein x is an integer from 1 to about 10 inclusive.

Likewise, when the phosphonic acids are esterified, the organic ester portion may also be non-deleteriously substituted. Examples of substituted esters include but are not limited to those wherein one or more hydrogens of the organic ester part of the molecule is substituted by $C_xH_{2x+1}O$ and/or $C_xH_{2x+1}S$ wherein x is an integer from 1 to about 10 inclusive, and/or by unsubstituted phenyl, and/or phenyl substituted by Cl, Br, $C_xH_{2x+1}$ or $O-C_xH_{2x+1}$ wherein x is 1-10.

In addition to the most preferred catalyst 2-(2'-pyridyl)ethylphosphonic acid and its alkyl esters, other specific catalysts worthy of mention include but are not limited to: 3-(2'-pyridyl)propylphosphonic acid, 4-(2'-pyridyl)butylphosphonic acid, 5-(2'-pyridyl)amylphosphonic acid, diethyl 2-(2'-pyridyl)ethylphosphonate, and diethyl 3-(1-pyrrolidino)propylphosphonate.

In accordance with the invention, the base is provided for the purposes of neutralizing the acidity of the polymer, primarily caused by addition of the phosphorus acid catalysts and other phosphorous acid compounds which contribute to the acidity of the polymer. Consequently, the base can be provided wholly or partially by supplying the catalyst as an alkali metal salt, or as an alkaline earth metal salt. If desired, alkali metal hydroxides or alkaline earth metal hydroxides can be added separately to the reaction mixture to form the salts of the catalysts in situ. Preferably, salts of the above mentioned hydroxides and weak acids can be added to accomplish the same result; for example, potassium adipate or potassium acetate or, most preferably, alkali metal bicarbonates such as potassium bicarbonate.

Since the invention can be applied to both solid phase and melt phase polymerization in both continuous and batch processes, many variations of the process are possible. In the process, reaction conditions including heating and reduced pressure are typically employed although the exact reaction conditions and the method for introduction of the base and catalyst into the reaction mixture can vary widely with the type of process.

A particularly convenient method for adding the base and catalyst is to provide the base and catalyst in the initial solution of polymer ingredients in which polymerization is initiated, e.g., the hexamethylene-diammonium adipate solution used for making 66 nylon. Alternately, the base and catalyst can be introduced into the polymer prior to final polymerization such as by injection into a low RV polymer melt or by other similar means. For effective solid phase polymerization, it is necessary for the base and catalyst to be thoroughly dispersed in the polymer. In general, this requires that the base and catalyst be added initially to the salt solution or at a later stage when the polymer is molten. Low RV polymer flake or powder containing the base and catalyst can be readily used in solid phase polymerization processes.

In melt polymerization processes, the upper limit of the temperature during the process is generally dictated by the rate of decomposition of the polymer at the elevated temperature taking into consideration the length of time needed to provide the desired RV increase. Lower temperatures are determined by the melting point of the polymer and the temperature needed to promote reaction under the conditions. In the case of 66 nylon, the operating temperature is usually between about 265°-300°, preferably about 270°-295° C.

Conversely, in solid phase polymerization processes, the temperature should be sufficiently below the melting temperature of the polymer, preferably at least 15° C. below the melting point, to avoid the formation of a sticky mass. For example, since 66 nylon melts at about 255°-265° C., the preferred operating temperature for solid phase polymerization is about 130°-245° C., most preferably about 150°-200° C.

The reaction time for the melt polymerization process is that which is sufficient to obtain the desired increase in molecular weight, the preferred reaction time being generally about 5 to 75 minutes. For solid phase polymerization processes, generally longer reaction times are required, typically in the range of 5 minutes to 18 hours.

The amount of catalyst employed in the reaction mixture is that which is sufficient to obtain a catalytic effect. Preferably, the catalyst is present in the polyamide in an amount between about 1 and about 15 moles per $10^6$ g of polymer and the base is present in an amount between about 1 and about 40 equivalents per $10^6$ g of polymer. It is also advantageous for the ratio of equivalents of base to moles of total phosphorous acid compounds present in the mixture to be at least about 0.5, preferably, at least about 1.0, most preferably at least about 2.0. "Total phosphorous acid compounds" is intended to refer to all phosphorus-containing compounds present in the polymer which contribute to the acidity of the polymer in the molten state. Such compounds include, for example, catalysts in accordance with Formula I above, being either free acid or esters, together with other phosphorus-containing compounds which serve other functions such as antioxidants and which contribute to polymer acidity.

Finally, the reaction is conducted preferably in the absence of air or oxygen, for example, in the presence of an inert gas such as nitrogen, and the amount of moisture in the reaction mixture is controlled to promote the amidation reaction such as by reducing the pressure of the gas in contact with the reaction mixture.

Depending on the ultimate end-uses, the polymerization processes may necessitate the use of other materials in the reaction mixtures beyond the polymer ingredients, catalyst and base. Materials such as thermal protective agents, antioxidants, and pigments/delustrants may be used. Examples of thermal protective agents are copper salts, usually in combination with metal halides. Typical antioxidants for polyamides are phosphorous compounds, such as phenylphosphinic acid and its salts, or hindered phenols.

The process of the invention provides a process for increasing the RV of polyamides with reduced thermal degradation. Unlike the phosphorous acid catalysts used in known processes, the process of the invention shows relatively little loss of catalytic activity with base addition. The preferred catalytic species of this invention, 2-(2'-pyridyl)-ethylphosphonic acid (abbreviated herein as "PEPA"), in the presence of base not only leads to an increase in the rate of amidation but decreased thermal degradation and gelation. Moreover, it also has the beneficial effect of decreasing the precipitation of copper-containing solids if copper salts are present in the polymer.

TEST METHODS

Relative Viscosity: Relative viscosity refers to the ratio of solution and solvent viscosities measured in a capillary viscometer at 25° C. The solvent is formic acid containing 10% by weight of water. The solution is 8.4% by weight polyamide polymer dissolved in the solvent.

Gelation Time is determined by observing the time required to show an inflection in melt viscosity of a polymer sample maintained at constant elevated temperature.

Yarn color measurements are made using a Hunterlab Model D25M-9 colorimeter (Hunter Associates Laboratory, Inc., Reston, Va.) using Hunterlab's L, "a" and "b" scale. Color was measured on a bobbin of yarn by placing the bobbin on a cradle with a "window" cutout for the colorimeter.

The invention is illustrated in the following examples which are not intended to be limiting. Parts and percentages are by weight unless otherwise indicated. Quantities of potassium bicarbonate base are reported as moles but it should be appreciated that moles and equivalents are the same for this base.

EXAMPLES

I. Melt Polymerization In An Autoclave

Example 1 & Comparative Examples 1-5

In Example 1 and Comparative Examples 1-5, a series of ten-pound batches of 66 nylon were prepared from hexamethylenediammonium adipate plus additives using an autoclave. Added to the salt for each batch were copper acetate monohydrate in the amount of 0.024 weight percent (based on the polymer to be formed), potassium iodide in the amount of 0.050 weight percent, and potassium bromide in the amount of 0.107 weight percent. Batches were prepared with various catalyst/base combinations, as shown in Table I. PEPA refers to 2-(2'-pyridyl)ethylphosphonic acid.

TABLE I

| Reference | Catalyst (@ 10.52 mol/$10^6$ g polymer | Potassium Bicarbonate (mol/$10^6$ g polymer) |
|---|---|---|
| Comp. Ex. 1 | none | 0 |
| Comp. Ex. 2 | Phenylphosphonic acid | 0 |

TABLE I-continued

| Reference | Catalyst (@ 10.52 mol/$10^6$ polymer | Potassium Bicarbonate (mol/$10^6$ g polymer) |
|---|---|---|
| Comp. Ex. 3 | Phenylphosphonic acid | 10.5 |
| Comp. Ex. 4 | Phenylphosphonic acid | 21.0 |
| Comp. Ex. 5 | PEPA | 0 |
| Example 1 | PEPA | 10.5 |

Each batch was polymerized with a standard autoclave cycle and finished at 1 atm steam and 272° C. for 30 min. RV results are listed in Table II as Batch RV.

RV increase under vacuum was determined for these flake samples. In each run, 45 grams of flake was placed in a mini-reactor and 15 grams of water added. The sample was heated to 275° C. under 1 atm steam and held for 45 min, then pressure was reduced to 200 mm Hg over 5 min. Vacuum was held for 0, 5, or 10 min, and then the samples were quenched. RV data is shown in Table II and in FIG. 1.

Each of the samples was held under 1 atm steam at 292° C. to determine the time until gelation (catastrophic increase in melt viscosity). Data is presented in Table II.

TABLE II

| Reference | Batch RV | RV, 0 min @ 200 mm | RV, 5 min @ 200 mm | RV, 10 min @ 200 mm | Gel Time, hours |
|---|---|---|---|---|---|
| Comp. Ex. 1 | 51 | 75 | 86 | 81 | 14.3 |
| Comp. Ex. 2 | 58 | 76 | 96 | 125 | 12.8 |
| Comp. Ex. 3 | 58 | 80 | 86 | 80 | 16.0 |
| Comp. Ex. 4 | 47 | 66 | 77 | 73 | 17.7 |
| Comp. Ex. 5 | 65 | 97 | 138 | 165 | 13.1 |
| Example 1 | 62 | 96 | 126 | 135 | 17.4 |

Note that Example 1, containing the PEPA/bicarbonate system maintained outstanding catalytic activity, while Comparative Example 3, the phenylphosphonic acid/bicarbonate system exhibited essentially no catalysis versus Comparative Example 1, which contained no catalyst. Also note that the gel time for Example 1 is significantly extended versus Comparative Example 5 (PEPA catalyst, but no bicarbonate), indicating reduced gelation due to bicarbonate addition while maintaining excellent catalytic activity.

II. Melt Polymerization In A Continuous Polymerizer

Examples 2-4 And Comparative Example 6

These examples illustrate the practice of the invention to maintain good catalysis during the continuous polymerization and spinning of polyhexamethylene adipamide (66 nylon) and in reducing the spun yarn color (yellowness).

Comparative Example 6

To a ~50% by weight aqueous solution of hexamethylenediammonium adipate is added about 0.0944 weight % (based on the polymer to be formed) of potassium bromide, about 0.0498 weight % of potassium iodide, and 4 moles of 2-(2'-pyridyl)ethyl phosphonic acid (PEPA) per $10^6$ g of polymer. This polyamide-forming salt solution is fed to a conventional continuous polymerization apparatus in a process similar to the type disclosed in U.S. Pat. No. 3,947,424 (Tomek) except that an aqueous solution of cupric bromide is injected into the flasher inlet line in an amount sufficient to give about 65 parts per million by weight of copper in the finished polymer, instead of cupric acetate being added to the hexamethylenediammonium adipate solution. The reaction system consists sequentially of an evaporator stage, a reactor stage, a flasher stage, a steam/polymer separator stage and a vacuum finishing stage (reported as mm Hg., abs. in Table III). The resulting molten polymer is directly spun into filaments and drawn providing a high tenacity industrial nylon yarn of 1890 denier, containing 280 filaments. Results are reported in Table III below. The yarn RV is very high at 111, but the color of the yarn was relatively yellow ("b" color or yellowness), indicating some thermal degradation.

Example 2

To a similar solution of polyamide-forming solution as prepared above, there is added 3 moles PEPA/$10^6$ g polymer, 3.5 moles potassium bicarbonate/$10^6$ g polymer and 0.05 weight % (3.5 moles/$10^6$ g polymer) phenylphosphinic acid (PPA). The ratio of equivalents of base to moles of total phosphorous acid compounds is 0.54. Polymer is formed and spun into filaments as in Comparative Example 6 except for finisher vacuum (see Table III). Results are reported in Table III below.

Example 3

To a similar solution of polyamide-forming solution as prepared in Comparative Example 6 above, there is added 2 moles of PEPA per $10^6$ g of polymer, 13 moles potassium bicarbonate per $10^6$ g of polymer, and 0.05 weight % (3.5 moles/$10^6$ g polymer) PPA. The ratio of equivalents of base to moles of total phosphorous acid compounds is 2.4. Polymer is formed and spun into filaments as in Comparative Example 6 except for finisher vacuum (see Table III). Results are reported in Table III below.

Example 4

To a similar solution of polyamide-forming solution as prepared in Comparative Example 6 above, there is added 2 moles of PEPA, 16.2 moles of potassium bicarbonate per million grams of polymer, and 0.075 weight % (5.3 moles/$10^6$ g polymer) PPA. The ratio of equivalents of base to phosphorous acid compounds is 2.2. Polymer is formed and spun into filaments is in Comparative Example 6 except for finisher vacuum (See Table III).

Samples of the above-described polymers and filaments are then analyzed for relative viscosity and yarn color, respectively. Results are shown in Table III.

As can be seen from Examples 2–4 in Table III, the combination of PEPA catalyst with bicarbonate base and phenylphosphinic acid (PPA) gives an outstanding combination of high RV (97-100) and good filament color (low thermal degradation), especially for Examples 3 and 4.

III. Melt Polymerization In Lab Scale Apparatus

Examples 5–7 And Comparative Examples 7–10

Examples 5–7 and Comparative Examples 7–10 demonstrate laboratory scale melt phase polymerization and, as described in more detail below, low molecular weight nylon samples were melted under an equilibrating steam pressure of 760 mm. The steam pressure was reduced to 200 mm and the amidation reaction quenched before a new equilibrium could be attained. Relative viscosity is then measured. The magnitude of the relative viscosity increase ar 200 mm is representative of the rate at which the sample approached the new equilibrium and is therefore representative of the effectiveness of the catalyst in the sample. When present, catalyst has been added at a concentration of 10 moles/$10^6$ g nylon and potassium bicarbonate at 22 moles/$10^6$ g of nylon. RV data for all of these Examples and Comparatives are listed in Table IV.

Comparative Example 7

This comparative example illustrates melt polymerization in the absence of a catalyst or additives.

A Pyrex ® tube 200 mm long and 28 mm in inside diameter was loaded with 2 milliliters of water and 10 grams of 66 nylon (Zytel ® 101). The top of the tube was sealed with a reactor head made by Lab-Crest Scientific that was fitted with gas ports, a syringe port, and a helical stirrer. After flushing the contents of the tube for 5 minutes with argon, the bottom 6 to 7 inches of the tube were lowered into a refluxing dimethylphthalate vapor bath at 282° C. This caused the two milliliters of water already in the tube to rapidly vaporize providing the start of a steam atmosphere. After 5 minutes additional water was pumped into the reaction tube at rate of 1 ml/minute in order to maintain the steam atmosphere and flush out any residual argon. After another 55 minutes, water addition was stopped. Five minutes later the helical stirrer was started and stirring continued for 30 minutes at 282° C. under 760 mm of steam. Polymerization was initiated by evacuating the tube to a pressure of 200 mm. Ten minutes later the vacuum was replaced by argon at 760 mm, stirring was stopped, polymer was allowed to drain briefly from the helical stirrer, and the tube transferred from the dimethylphthalate vapor bath to an ice water bath, quenching the reaction and breaking the glass tube. The recovered nylon was ground up to 5.5 g of coarse powder which was found to have a relative viscosity of 88.

Comparative Example 8

This Comparative Example illustrates melt polymerization using the catalyst 3-(2'-pyridyl)propylphosphonic acid without other additives.

The same procedures were used as in Comparative Example 7, except the Pyrex ® tube was loaded with 2 milliliters of water, 0.020 grams of 3-(2'-pyridyl)propyl-

TABLE III

| Reference | PEPA Moles/Million grams | KHCO$_3$ Moles/Million grams | Wt. % PPA | Finisher mm Hg., abs. | Polymer RV | Yarn Color "b"* (yellowness) |
|---|---|---|---|---|---|---|
| Comparative Ex. 6 | 4.0 | — | — | 240 | 111 | 4.9 |
| Example 2 | 3.0 | 3.5 | 0.05 | 210 | 97 | 4.7 |
| Example 3 | 2.0 | 13.0 | 0.05 | 140 | 100 | 3.5 |
| Example 4 | 2.0 | 16.2 | 0.075 | 140 | 100 | 2.9 |

*Lower values of "b" correspond to improved whiteness.

phosphonic acid, and 10 grams of the same 66 nylon polymer (Zytel® 101). This makes a catalyst concentration of 10 moles of 3-(2'-pyridyl)propylphosphonic acid/million grams of nylon. After the polymerization reaction, the recovered nylon was ground up to 3.4 grams of coarse powder which was found to have a relative viscosity of 575.

Example 5

This example illustrates melt polymerization using the catalyst 3-(2'-pyridyl)propylphosphonic acid in the presence of bicarbonate base.

The same procedures were used as in Comparative Examples 7 and 8, except the Pyrex® tube was loaded with 2 milliliters of water, 0.020 grams of 3-(2'-pyridyl)propylphosphonic acid, 0.022 grams of potassium bicarbonate, and 10 grams of 66 nylon (Zytel® 101). This makes concentrations of 10 moles of 3-(2'-pyridyl)propylphosphonic acid/million grams of nylon and 22 moles of potassium bicarbonate/million grams of nylon. The recovered nylon was ground up to 7.0 grams of coarse powder which was round to have a relative viscosity of 169 This Example shows that 3-(2'-pyridyl)propylphosphonic acid is a good catalyst for 66 nylon polymerization, even in the presence of base.

Example 6 And Comparative Example 9

The method of comparing a catalyst for the polymerization of 66 nylon with and without bicarbonate base, illustrated above in Example 5 and Comparative Example 8, was repeated for the catalyst 2-(2'-pyridyl)ethylphosphonic acid (PEPA).

With PEPA and no bicarbonate base, the resulting RV of the polymer was 239 (Comparative Example 9) With PEPA and bicarbonate, the RV was 138 (Example 6). These experiments show that PEPA is a very effective polymerization catalyst for 66 nylon, even in the presence of base.

Example 7 And Comparative Example 10

The method of comparing a catalyst with and without a base, illustrated in Example 5 and Comparative Example 8, was used with catalyst diethyl 3-(1-pyrrolidino)propylphosphonate. The resulting polymer RV, with the catalyst and no base, was 188 (Comparative Example 10). With the catalyst and bicarbonate base, the RV was 131 (Example 7). These experiments show that diethyl 3-(1-pyrrolidino)-propylphosphonate is a very effective catalyst for 66 nylon polymerization, even in the presence of base.

Example 8 And Comparative Examples 11–12

This Example and its Comparatives were prepared in the same way as were Examples 5–7 and Comparatives 7–10 except that the polyamide used was 6 nylon instead of 66 nylon. RV results are summarized in Table IV.

Comparative Example 11

This Comparative Example illustrates the melt polymerization of 6 nylon in the absence of catalyst.

The same procedures were used as in Comparative Example 7, except the Pyrex tube was loaded with 2 milliliters of water and 10 g of 6 nylon (Capron 8207F, 65 RV, Allied-Signal Inc., Chesterfield Plant, Hopewell, Va.). After the polymerization reaction, the recovered nylon was ground up to 6.2 g of coarse powder which was found to have a relative viscosity of 68.

Comparative Example 12

This Comparative Example illustrates good catalysis of the melt polymerization of 6 nylon by 2-(2'-pyridyl)ethylphosphonic acid (PEPA).

The same procedures were used as in Comparative Example 7, except the Pyrex tube was loaded with 2 milliliters of water, 0.0187 g of PEPA, and 10 g or 6 nylon (Capron 8207F, 65 RV, Allied-Signal Inc., Chesterfield Plant, Hopewell, Va.). This makes a catalyst concentration of 10 moles of PEPA/million grams of 6 nylon. After the polymerization reaction, the recovered nylon was ground up to 4.7 g of coarse powder which was found to have a relative viscosity of 182.

EXAMPLE 8

This Example illustrates melt polymerization using the catalyst 2-(2'-pyridyl)ethylphosphonic acid (PEPA) in the presence of base.

The same procedures were used as in Comparative Example 7, except the Pyrex tube was loaded with 2 milliliters of water, 0.0187 g of PEPA, 0.022 g of potassium bicarbonate, and 10 g of 6 nylon (Capron 8207F, 65 RV, Allied-Signal Inc., Chesterfield Plant, Hopewell, Va.). This makes concentrations of 10 moles of PEPA/million grams of nylon and 22 moles of potassium bicarbonate/million grams of nylon. After the polymerization reaction, the recovered nylon was ground up to 5.3 g of coarse powder which was found to have a relative viscosity of 113. This Example shows that PEPA is a good catalyst for 6 nylon polymerization, even in the presence or base.

TABLE IV

| Reference | Polyamide Type | Additives | RV |
|---|---|---|---|
| Comp. Ex. 7 | 66 Nylon | None, Control | 88 |
| Comp. Ex. 8 | " | 3-(2'-Pyridyl)propylphosphonic Acid | 575 |
| Example 5 | " | 3-(2'-Pyridyl)propylphosphonic Acid/KHCO$_3$ | 169 |
| Comp. Ex. 9 | " | 2-(2'-Pyridyl)ethylphosphonic Acid | 239 |
| Example 6 | " | 2-(2'-Pyridyl)ethylphosphonic Acid/KHCO$_3$ | 138 |
| Comp. Ex. 10 | " | Diethyl 3-(1-Pyrrolidino)propylphosphonate | 188 |
| Example 7 | " | Diethyl 3-(1-Pyrrolidino)propylphosphonate/KHCO$_3$ | 131 |
| Comp. Ex. 11 | 6 Nylon | None | 68 |
| Comp. Ex. 12 | " | 2-(2'-Pyridyl)ethylphosphonic Acid | 182 |
| Example 8 | " | 2-(2'-Pyridyl)ethylphosphonic Acid/KHCO$_3$ | 113 |

IV. Solid Phase Polymerization In Lab-Scale Apparatus

Examples 9–10 And Comparative Examples 13–16

Comparative Examples 13–16 and Examples 9–10 demonstrate laboratory scale solid phase polymerization, and as described in more detail below, low molecular weight 66 nylon samples were stirred to homogeneity under an equilibrating steam pressure of 760 mm. The samples were then quenched, chopped to a coarse powder, and polymerized in the solid state under a flow of dry nitrogen at 160° C. When present, catalyst was added at 10 moles/10$^6$ g of polymer and KHCO$_3$ at 22 moles per 10$^6$ g of polymer. The relative viscosity increase was measured to evaluate the catalyst effectiveness under solid state conditions. For easy comparison, the RV's of all the Examples and Comparatives are listed in Table V.

Comparative Example 13

This comparative example illustrates solid phase polymerization in the absence of a catalyst or additives.

The procedure of Comparative Example 7 was used to make 66 nylon for the solid phase polymerization except that the vacuum cycle was omitted. The recovered nylon was chopped to 7.89 g of coarse powder which had an RV of 62.

A 1.5 g sample of the 62 RV powder was placed on a glass frit at the bottom of a 25 mm wide by 173 mm long glass tube. Dry nitrogen was introduced at the bottom of the glass tube at a rate of 1 liter/minute via a long spiral of ⅛ inch copper tubing wrapped around the outside of the glass. The glass tube with the surrounding copper pipe was plunged into a 160° C. sand bath and temperature control for the bath switched over to a thermocouple held ~1 inch above the nylon sample on the glass frit. After a total reaction time of 1 hour, the glass tube was removed from the bath and the nylon sample cooled. RV was again measured and it had changed only one unit to 63.

Comparative Example 14

The procedure of Comparative Example 13 was repeated, except that 22 moles of potassium bicarbonate per $10^6$ g of nylon was added. The resulting RV was 57 after equilibration under 1 atmosphere of steam and 63 after solid phase polymerization. This illustrates that, as is well-known, bicarbonate base has no significant catalytic effect on 66 nylon polymerization.

Comparative Example 15

This example illustrates solid phase polymerization using the catalyst 2-(2'-pyridyl)-ethylphosphonic acid (PEPA) without base.

To produce the polymer for solid phase polymerization, the Pyrex® tube as in Comparative Example 7 was loaded with 2 milliters of water, 0.0188 g of 2-(2'-pyridyl)ethylphosphonic acid, and 10 grams of 66 nylon (Zytel®101). This makes a catalyst concentration of 10 moles of 2-(2'-pyridyl)ethylphosphonic acid/$10^6$ g of nylon. The recovered nylon after equilibration under 1 atm. of steam (no vacuum was applied) was chopped to 8.12 g of coarse powder which was found to have a RV of 65. Solid phase polymerization of the 65 RV polymer was done as in Comparative Example 13. Measured RV was 145.

EXAMPLE 9

This example illustrates solid phase polymerization using the catalyst 2-(2'-pyridyl)ethylphosphonic acid (PEPA) in the presence of potassium bicarbonate.

The same procedures were used as in Comparative Example 15 except the Pyrex® tube was loaded with 2 milliters of water, 0.0188 g of PEPA, 0.022 g of potassium bicarbonate, and 10 grams of 66 nylon (Zytel® 101). This makes concentrations of 10 moles of 2-(2'-pyridyl)ethylphosphonic acid/$10^6$ g of nylon and 22 moles of potassium bicarbonate/$10^6$ g of nylon. The recovered nylon was chopped to 8 g of coarse powder which found to have a RV of 58.

Solid phase polymerization of the 58 RV polymer was done as in Comparative Example 13. Measured RV was 97, an increase of 39 units.

Example 10 And Comparative Example 16

This Example and its Comparative Example were run exactly like Example 9 and Comparative Example 15, except that the catalyst was diethyl 3-(1-pyrrolidino)-propylphosphonate instead of PEPA. In Comparative Example 16, the only additive was the catalyst at 10 moles per $10^6$ g of nylon and the resulting RV was 87. In Example 10, the additives were the catalyst (10 moles per $10^6$ g of nylon) and potassium bicarbonate (22 moles per $10^6$ g of nylon), and the resulting RV was 117.

Example 10 shows the effectiveness of diethyl 3-(1-pyrrolidino)propylphosphonate as a catalyst for solid-phase polymerization of nylon even in the presence of base.

TABLE V

| Reference | Additives | RV Before (Equil At 1 Atm Steam) | RV After Solid Phase Polymer. (160° C./1 Hr.) |
|---|---|---|---|
| Comp. Ex. 13 | None | 62 | 63 |
| Comp. Ex. 14 | KHCO3 (22 moles/MM g) | 57 | 63 |
| Comp. Ex. 15 | 2-(2'-Pyridyl)ethylphosphonic acid | 65 | 145 |
| Example 9 | 2-(2'-Pyridyl)ethylphosphonic acid/KHCO3 | 58 | 97 |
| Comp. Ex. 16 | Diethyl 3-(1-pyrrolidino)-propylphosphonate | 63 | 87 |
| Example 10 | Diethyl 3-(1-pyrrolidino)-propylphosphonate/KHCO3 | 85 | 117 |

We claim:

1. A process for increasing the relative viscosity of a polyamide comprising heating the polyamide in the presence of a base and a catalyst, said catalyst being at least one compound of the formula:

$$X-(CH_2)_nPO_3R_2$$

wherein
X is 2-pyridyl, 4-morpholino, 1-pyrrolidino, 1-piperidino or $R'_2$—N— wherein R', being the same or different, is an alkyl group having between 1 and 12 carbon atoms;
n is an integer from 2 to 5; and
R, being the same or different, is H or an alkyl group having between 1 and 12 carbon atoms.

2. The process of claim 1 wherein said catalyst is present in said polyamide in an amount between about 1 and about 15 moles per $10^6$ g of polymer.

3. The process of claim 1 or 2 wherein said base is present in an amount between about 1 and about 40 equivalents per $10^6$ g of polymer.

4. The process of claim 3 wherein the ratio of equivalents of base to moles of total phosphorous acid compounds present is at least about 0.5.

5. The process of claim 3 wherein the ratio of equivalents of base to moles of total phosphorous acid compounds present is at least about 1.0.

6. The process of claim 3 wherein the ratio of equivalents of base to moles of total phosphorous acid compounds present is at least about 2.0.

7. The process of claim 1 wherein said polyamide is selected from the class consisting of aliphatic polyamides having amide units formed from a 5, 6, or 7 carbon diacid.

8. The process of claim 1 wherein said polyamide is selected from the class consisting of aliphatic polyadipamides.

9. The process of claim 1 wherein said polyamide is poly(hexamethylene adipamide).

10. The process of claim 1 wherein X is 2-pyridyl or 1-pyrrolidino.

11. The process of claim 1 wherein X is 2-pyridyl and n is 2.

12. The process of claim 1 wherein said base is selected from the class consisting of alkali metal bicarbonates.

13. The process of claim 1 wherein the relative viscosity of said polyamide is increased to above about 60, said relative viscosity being measured in a capillary viscometer at 25° C. in a solution formed by dissolving 8.4% by weight polyamide polymer in a solvent of formic acid containing 10% by weight of water.

14. The process of claim 13 wherein said relative viscosity of said polyamide is increased to above about 90.

* * * * *